Figure 1:
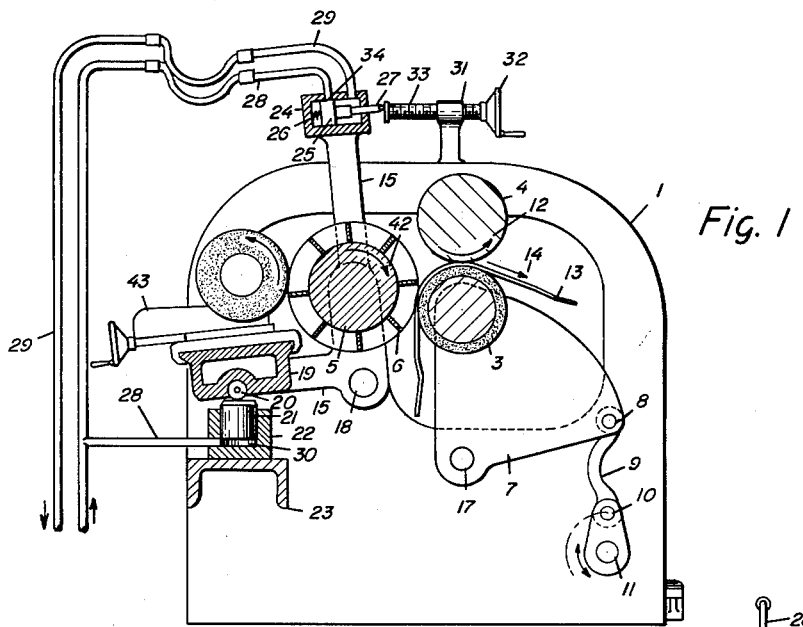

July 3, 1962

E. GIANOGLIO 3,041,865

DEVICE FOR ADJUSTING THE THICKNESS IN
ROTARY TANNERY MACHINES

Filed March 29, 1960

2 Sheets-Sheet 1

INVENTOR
Ermanno Gianoglio by Richardson, David & Nordon

Attorneys

July 3, 1962

E. GIANOGLIO 3,041,865

DEVICE FOR ADJUSTING THE THICKNESS IN
ROTARY TANNERY MACHINES

Filed March 29, 1960

2 Sheets-Sheet 2

INVENTOR
*Ermanno Gianoglio* by *Richardson, David & Nordon*

Attorney

United States Patent Office

3,041,865
Patented July 3, 1962

3,041,865
DEVICE FOR ADJUSTING THE THICKNESS IN ROTARY TANNERY MACHINES
Ermanno Gianoglio, Milan, Italy, assignor to S.p.A. Luigi Rizzi & C., Modena, Italy, a company of Italy
Filed Mar. 29, 1960, Ser. No. 18,398
Claims priority, application Italy Sept. 21, 1959
6 Claims. (Cl. 69—42)

The present invention relates to rotary machines as employed in the tanning industry for the processing of skins and hides, such as, for instance, fleshing machines, shaving machines, dehairing machines, scudding machines, sammying machines, setting machines, staking machines, buffing machines and the like.

More particularly the invention relates to a device for adjusting the spacing between the member supporting the skin being processed and the processing tools used with the machines mentioned above.

Rotary machines for the processing of skins normally comprise at least one supporting roller whereon the skin to be treated is laid and against which there acts at least one other roller driven to turn around its own axis to provide with the aid of the said supporting roller or rollers movement of the skin to be processed. The tools which according to the kind of machine in question may be constituted by helical blades, by breaking irons or fleshing knives, by abrading members or the like, are arranged on the periphery of an operating cylinder which, too, is rotated around its own axis. The roller or rollers for supporting the skin against the upper feed roller or rollers move the skin being processed to contact the tools of the operating cylinder and with their rotation to displace it in such a way that the whole surface of the skin is subjected to the action of the tools.

To facilitate the placing of the skin to be treated on the supporting roller, that is to say, to make its introduction into the machine easy, the supporting roller or rollers are normally mounted in supports displaceable by means of special linkworks and cranks or the like in such manner as to make them movable away from the other members of the machine. A suitable pedal control permits, after placing the skin on the supporting roller, movement of said roller again near to the transporting cylinder and to the operating roller, thus bringing the skin against the tools.

The interaxial distance between the cylinder or rollers supporting the skin and the operating or processing roller should be variable and adjustable for various reasons: first of all because the skins to be treated display great variability in thickness due to their quality and size (lamb skins, goat skins, calf skins, cow or buffalo skins, etc.), or due to the differences of thickness between the various portions of the same skin. Moreover, said adjustment becomes necessary to vary the depth of action of the tools or to compensate for wear thereof when the blades are subjected to frequent sharpening by means of a special apparatus (as happens for instance with fleshing, shaving and like machines). With machines used so far the adjustment of the interaxial distance between the supporting cylinder and the operating roller, which hereinafter will be called for the sake of brevity "thickness adjustment," is effected by means of convenient members such as screws, eccentrics and the like which act upon the linkages that move the supports of the supporting roller by modifying the locations of the points at which said linkages are fulcrumed to the framing of the machine.

Owing to the heavy weight of the mobile members and the thrust existing between the supporting roller and the operating (processing) cylinder, the force causing the separating and the converging of the rollers is considerable and as a consequence the adjusting members have to be very sturdy.

A direct adjusting action, which needs to be quickly made as in the case of adjustment during the passage of skin, owing to the sturdiness of the members, would require a considerable effort.

To reduce said effort recourse is had at present to reduction systems, which, however, make adjustment both slow and cumbersome.

The adjustment by means of displacement of the supporting roller, which displacement may assume considerable magnitude, makes necessary with known systems a simultaneous adjustment of the position of the feed roller.

Another inconvenience of the adjusting systems of the kind above described is that with machines operating with tools such as blades (knives) requiring frequent and continuous sharpening, adjustment has to be corrected frequently to compensate for the progressive wear of the tools.

It is a main object of the present invention to eliminate the inconveniences of the devices for thickness adjusting, as used presently, and to create a sensitive and exact device such as to permit adjustment with greatest facility and rapidity and with minimal effort. Another object of the invention is to render invariable the relative positions of the supporting roller and of the transporting roller for the skin so as to eliminate the need for adjustment also of the position of the upper or top transporting roller.

A further object of the invention is to provide an adjusting device for automatically compensating for the wearing away of the tools, for machines wherein the tools are subjected to consumption by sharpening, in such a way as to reduce the labor of the workers operating the machines, to the mere operations required by the variations of quality of the skins to be treated.

The present invention solves the problems mentioned above by adopting a device for the adjusting of thickness control, with hydraulic servo-control, comprising hydraulic jacks controlled by a special valve actuated by an adjusting member for maintaining the distance between the axis of the skin-supporting roller and that of the operating or processing cylinder, at a predetermined value and to keep this value unvaried depending on the position of the adjusting member.

This hydraulic servo-control adjusting device makes possible due to its high sensitivity and quick response not only determination of the desired accurate relative positions of the supporting roller and of the operating or processing cylinder, at the beginning of processing, by a simple operation which in practice does not require any effort, thereby permitting the personnel immediately to check said relative positions on a graduated scale with tenths of millimeter accuracy; but also allows for the first time a rapid and accurate variation of the thickness during processing, which is particularly advantageous if one considers the differences of thickness which sometimes are considerable from area to area of the same skin being worked.

While with the mechanical systems adopted heretofore, this concept of the possibility of accurate and rapid adjustment of the thickness control during the processing was absolutely lacking, it should be noted that modern machines operate with rates of passage of the skins much greater than occurred heretofore, hence only an adjustment produced with great rapidity appears to be useful and effective.

Hence it is clear what important advantage the device according to this invention offers as compared with operation of conventional tanning factory machines.

In addition to the advantages which have been summarized hereinbefore, the adjustment device with hydraulic servo-control according to the present invention also affords further advantages of great importance.

According to a preferred embodiment of the invention, it is proposed to mount the entire assembly comprising the operating or processing cylinder carrying the tools and the sharpening apparatus for the latter (where such an apparatus is required by the particular needs of the machine) on movable supports, preferably oscillatable ones, in the frame of the machine and to make the hydraulic jacks act upon said movable supports or oscillatable supports in such a way as to adjust the distance between the axis of the roller for supporting the skin and the axis of the operating cylinder but by conveniently displacing the assembly comprising the operating cylinder.

This arrangement is particularly convenient in the cases in which the displacement must necessarily assume considerable magnitudes owing to the wear of the tools. In fact by adjustment of the position of the operating cylinder, there remains unvaried the relative positions between the supporting roller and the drive roller, and, therefore, a simultaneous adjustment of the position of the latter roller becomes unnecessary.

Notwithstanding the sturdiness and the weight of the assembly comprising the operating cylinder and the sharpening apparatus, the displacement of said assembly is rendered easy and rapid by the hydraulic servo-control provided according to the invention and which requires minimal effort for actuation.

An important feature of the invention consists in the operation of the adjusting device in such a manner as to compensate automatically for the variations of the distance between the roller for supporting the skin and the operating surface of the tools, which variations are due to the consumption of the tools when these are subjected to frequent or continuous sharpening.

A possible embodiment in practice of this principle consists in mounting one of the two members, comprising the valve for controlling the jacks and the adjusting member that actuates said valve, in fixed position on the frame of the machine and the other member in oscillatable or otherwise displaceable manner on the support of the operating cylinder and making the position of this latter member on said support depend on the degree of wear of the tools.

It will be understood that this automatic adjustment for compensating for the wear of the tools is quite independent of any possible adjustment effected by actuating the special adjusting member to intentionally modify the working thickness. With the device so constructed the need of attention by the operator is considerably diminished and the constant thickness control is assured with absolute safety even with tools subject to great wear.

Figure 2:
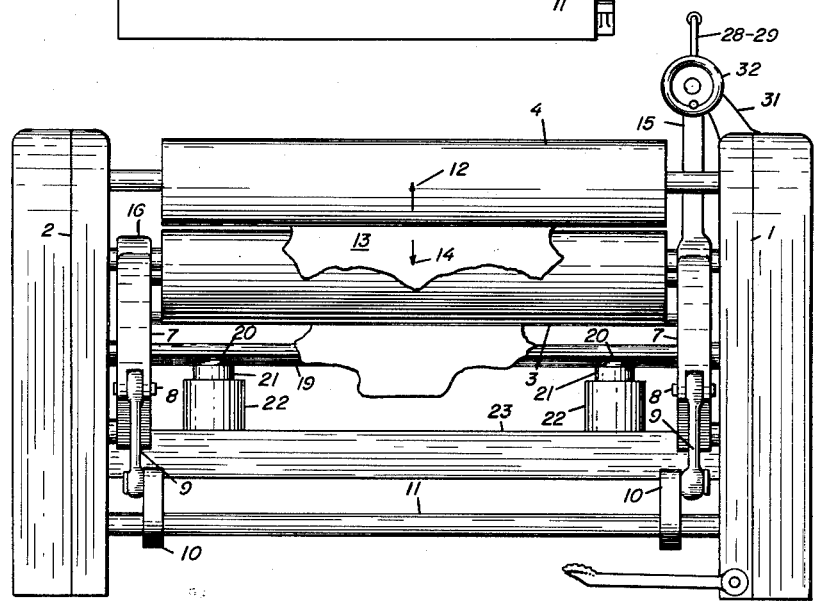
Figure 3:
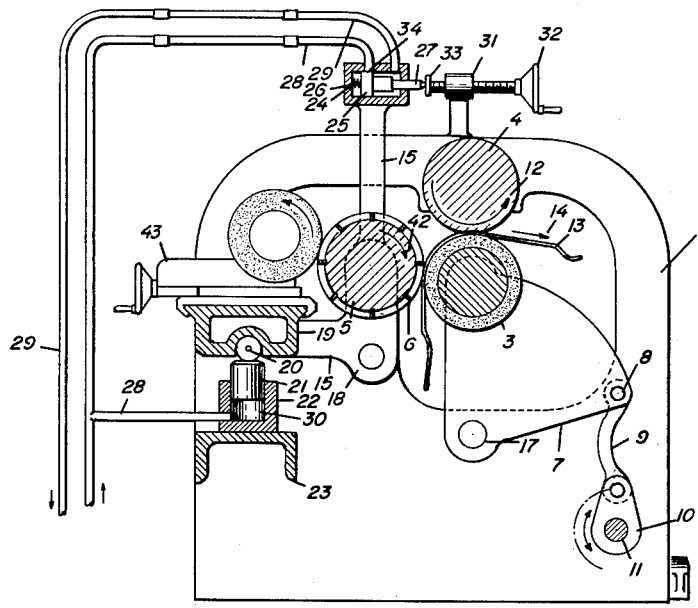
Figure 4:
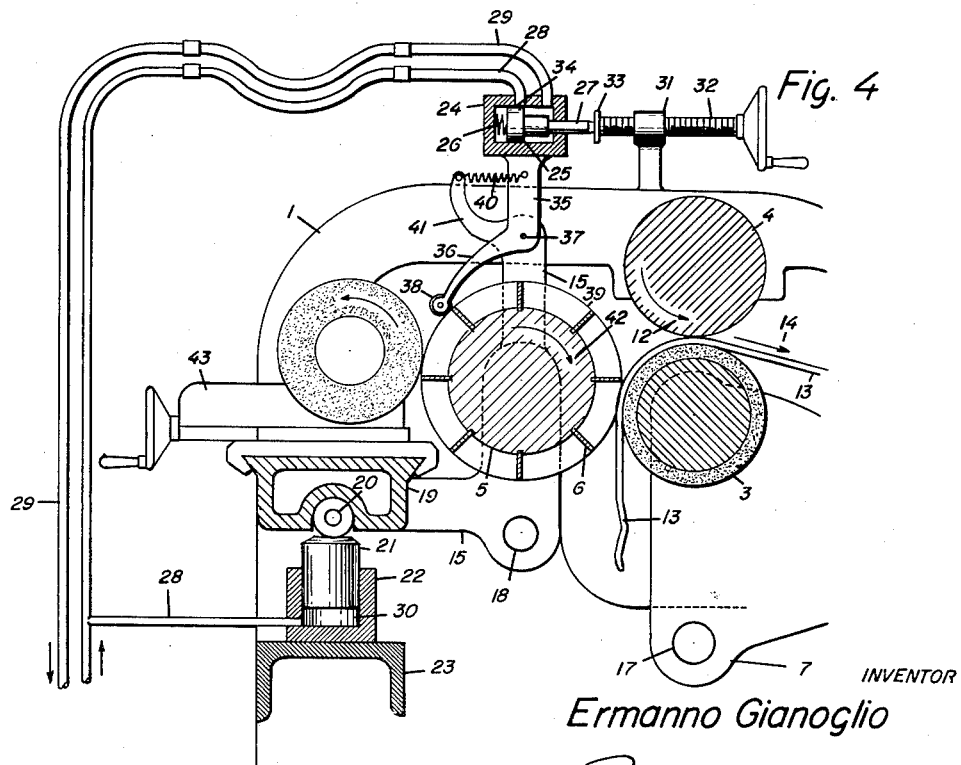

The invention will now be described more in detail with reference to some of its embodiments given merely by way of example and illustrated diagrammatically in the accompanying drawings wherein:

FIGURE 1 shows in cross-section a simplified type of machine with tools in the shape of helical knives or blades arranged radially at the periphery of the operating or processing cylinder, FIGURE 2 shows the same machine in front view, FIGURE 3 shows the same machine in section, similar to FIG. 1, with the tools considerably worn away, and FIGURE 4 shows in partial section the same type of machine as FIGS. 1, 2 and 3 with the device for automatic compensation for the wear of the tools.

It should be noted above all that in consideration of the fact that the machines to which the present invention relates are well known to those skilled in the art and that the invention concerns exclusively the device for adjusting the thickness controls, the accompanying drawings illustrate and the following description describes only those parts of a simplified type of machine which are necessary for the understanding of the invention.

It should be understood that all the remaining parts not illustrated and not particularly referred to in the description may be constructed in any manner according to conventional technique and according to the operations to be performed and to the requirements to be met in each case. For the sake of clearness all control members and members for actuating rollers and cylinders have been omitted, as well as other accessory members and many parts illustrated have been schematically represented.

With reference to FIGS. 1, 2 and 3, the side members 1 and 2 of the frame are shown which carry all the essential members of the machine, among which may be mentioned: the roll 3 for supporting the skin being processed, the top roll 4 for feeding or transporting the skin and the operating or processing cylinder 5 on the periphery of which are mounted radially the tools 6, which in the case illustrated are helical blades or knives (fleshing machines, shaving machines). The supporting roll 3 is rotating and supported at its ends in oscillatable supports indicated by reference numeral 7. These supports 7 have the shape of a substantially triangular plate and are oscillatable around the pins 17 by which they are pivoted to the sides 1 and 2 of the frame. The pivot 17 is located in the proximity of a corner of the triangular supports 7. In the proximity of another corner of said supports 7 there are placed the bearings for the roll 3, while the third corner is connected by means of the pin 8 to the connecting rod 9 whose other end is connected to the crank 10 adapted to be rotated a half revolution around the axis 11.

In the position illustrated for the oscillatable supports 7 the roll 3 opposes the roll 4 and the tools 6 of the cylinder 5, while by rotating the cranks 10 by a half revolution around the axis 11 one oscillates the supports 7 around the pivot 17 moving the roll 3 into a position far away from the roll 4 and from the cylinder 5.

The transport roll 4 is supported from the sides 1 and 2 of the frame and by means of actuating members (not illustrated) it can be rotated around its own axis for instance in the direction of the arrows 12.

In that way the roll 4 with the air of the supporting roll 3 effects the movement of the skin 13 being processed, in the direction of the arrow 14. In fact, the skin 13 is taken between the surfaces of the rolls 3 and 4 when the roll 3 is held in its nearby position (as illustrated in FIGURES 1, 2 and 3).

Conveniently the roll 3 is coated externally with a layer of rubber or the like material.

In the apparatus illustrated the operating or processing cylinder 5 is rotatably supported at its ends in oscillatable supports 15 and 16. Said supports 15 and 16 are pivoted at 18 to the respective side frames 1 and 2 and are constituted by two two-armed brackets.

The substantially horizontal arms of the supports 15 and 16 are connected with one another by a bed or seam 19 whereon there is mounted (in the case illustrated) a sharpening apparatus generally indicated 43 and movable by a slide along the beam 19. The beam 19 moreover carries all the accessories (not visible) for actuating the sharpening apparatus 43, while connected to the side frames 1 and 2 there are the members (motor, pulleys and belts not illustrated) for driving the operating cylinder 5 in the direction of the arrow 42.

These accessories, which do not per se form a part of the invention, may be of known and conventional constructions.

The beam 19 carries at its bottom one or two rotary rolls 20 which rest upon the piston or pistons 21 of one or two hydraulic jacks 22 carried by a beam 23 rigidly fixed to the side walls 1 and 2 of the frame.

In the apparatus illustrated, the bench 19 rests on the pistons 21 of the jacks 22 by its own weight and by the weight of the members and apparatus mounted thereon.

The substantially vertical arm of one of the oscillatable supports (in this case 15) carries a valve constituted by a small cylinder 24 wherein is slidable a piston 25.

Between the back of the small cylinder 24 and the piston 25 is a spring 26 which tends to displace the piston towards the opposed end of the small cylinder. At that end the piston 25 carries a shank 27 which passes through the corresponding end of the small cylinder 24.

To the small cylinder 24 there are connected two conduits, namely a first one 28 connected to a source of fluid under pressure (not illustrated) and a second one 29 connected to the return conduit of the fluid system. The bore 34 connects the interior of the said small sylinder with the conduit 28. The conduit 28, moreover, is connected with the chamber 30 of the jacks 22.

To the side frames 1 is rigidly connected a support 31 for an adjusting screw 32 which with its end 33 cooperates with the shank 27 projecting from the small cylinder 24 of the valve.

Operation of the adjusting device above described is as follows. Suppose that the adjusting screw 32 has been unscrewed in such a manner that its end 33 is not in contact with the shank 27. The fluid under pressure fed through the conduit 28 and coming for instance from a hydraulic unit (not shown) with which the machine normally is already equipped for other functions (opening and closing movement for the roller 3), arrives at the chamber 30 of the jack or jacks and at the same time at the bore 34 of the small cylinder 24, which is closed at that time by the piston 25. Consequently the pressure in the chamber 30 increases and the piston 21 of the jack 22 is lifted thereby raising the beam 19.

In that way the whole assembly carrying the operating or processing cylinder 5 is made to rotate around the pivot 18 and the cylinder 5 is moved toward the roller 3.

During this rotation, the small cylinder 24 of the valve approaches the end 33 of the adjusting screw 32 which comes into contact with the shank 27 of the piston 25.

The piston 25, therefore, moves in the small cylinder 24 until it partly opens the bore 34 permitting the fluid under pressure to escape from the discharge conduit 29. So an equilibrium position is created whence through the bore 34 and the conduit 29 that amount of fluid under pressure escapes that is necessary to keep in the chamber 30 of the jack 22 at a pressure sufficient to sustain the mobile unit carrying the cylinder 5 weighing upon the piston 21 of the jack. The position of said mobile unit and thereby that of the operating cylinder 5 is determined, therefore, by the position of the adjusting screw 32.

If one desires to move the operating cylinder 5 nearer to the supporting roller 3 either because thinner skins are to be worked upon or because one wishes to increase the depth of action of the tools, or because it is necessary to compensate for tool wear, it is merely necessary to rotate the adjusting screw 32 so as to make it withdraw from the valve 24—27 (see FIG. 3). In that case, the piston 25 and the shank 27 of the valve, pushed by the spring 26, follow immediately the displacement of the screw 32 and the piston 25 closes the bore 34 so that owing to the diminished or terminated discharge of the fluid under pressure, the pressure in the chamber 30 of the jack increases with consequent lifting of the piston 21 and of the mobile unit which rests thereon. Said lifting continues until the small cylinder 24 of the valve has approached the adjusting screw as much as is needed for the piston 25 to reopen the bore 34 and to thereby reestablish the balance.

On the other hand, if it is desired to move the operating or processing cylinder 5 away from the supporting roller 3, so as to increase the thickness adjustment, it is merely necessary to turn the screw 32 toward the discharge valve. Thus this piston 25 opens the bore 34 wider permitting a greater amount of fluid under pressure to flow off and consequently lowering the pressure in the chamber 30 of the jack.

The weight of the mobile unit that rests on the piston 21 of the jack 22 overcomes the thrust thereof and lowers the piston 21. The discharge valve then moves away from the adjusting screw until the piston 25 again closes the bore 34 at the equilibrium point.

In practice, the movements of the discharge valve take place simultaneously with the displacement of the adjusting screw 32 because the system is adapted to follow with immediately even infinitesimal displacements of the piston 25. As a consequence with the device according to the invention one adjusts the position of the operating or processing cylinder 5 with respect to the supporting roller 3 with extreme ease, without any effort, with rapidity and great accuracy by actuating the adjusting screw 32.

It is obvious that in lieu of the screw 32 it is possible to use any other analogous adjusting member, such as an eccentric, a cam or the like. Moreover, the adjusting member can shift on a graduated scale to permit an immediate reading of the working thickness.

To limit the adjustments required by operators to working needs only independent of the wear of the tools, that is to say, to obtain an automatic compensation for the wear of the tools, the above-described device can be further improved as will be described hereinafter with reference to FIGURE 4.

In FIGURE 4 is illustrated an adjusting device which comprises substantially the same elements as described with reference to FIGURES 1, 2 and 3. Said elements carry the same reference numerals and it is unnecessary to describe them again.

The device according to FIGURE 4 differs from the one already described, only in that the discharge valve, in lieu of being fixed directly to the substantial vertical arm of the mobile unit carrying the operating or processing cylinder 5, is rigidly fixed in this case to an arm 35 of a double lever oscillating around a pin 37 carried at the upper end of the bracket 15. The other arm 36 of the double lever carries at its end a small roll 38 which rests on the periphery of a disc 39 fixed at the end of the tools 6 of the operating or processing cylinder 5. A spring 40 which acts between the arm 35 and a projection 41 of the bracket 15 keeps the small roll 38 in contact with the disc 39.

The disc 39 is of sheet metal and undergoes the same sharpening and, therefore, the same wear consumption as the blades or knives 6. The position of the discharge valve with respect to the mobile unit carrying the operating or processing cylinder 5 is determined, therefore, by the radius of the disc 39.

As the blades or knives 6 are consumed and with them the disc 39 diminishes in diameter, the double lever 35—36 causes a corresponding withdrawal of the small cylinder 24 of the valve with respect to the adjusting screw and consequently, as seen, a lifting of the piston 21 of the jack 22 which lifts the mobile assembly or unit until restoring the balance which is attained when the operating cylinder 5 has drawn near to the supporting roller 3 by a magnitude corresponding to the lowering of the small roll 38, namely when the reduction by height of the blades or knives 6 has been compensated. Hence the distance between the periphery of the supporting roll 3 and the peripheral surface of the tools 6, constituting the working thickness adjustment, is kept unvaried. It should be noted that this automatic compensation for the wear of the tools is independent of any possible manual adjustment by means of the adjusting screw 32 as effected to modify at will the working thickness control.

The above-described examples of embodiments of the device according to the invention are susceptible of variations according to the requirements and needs of each case.

So for instance it may be required with some types of machines that the hydraulic jacks may be placed in different positions, or there may be desired different positions for and types of the balancing valve. Also the force balancing the thrust of the jacks, in lieu of being produced by the weight of the members to be displaced, may be provided by springs or by employing hydraulic jacks with double actions. Also, if the characteristics of the machines make it appear preferable, the jacks may displace the supporting member 3 for the skin in lieu of the operating or processing cylinder 5; this embodiment may be advantageous in cases in which the tools are not subjected to consumption by wear, hence the adjustment needed is of small amplitude and does not cause any disturbance to the relative interaction of the rollers 3 and 4.

I claim:

1. A device for adjusting the working thickness in rotary tannery machines comprising substantially supporting rollers and transporting rollers for the skins and an operating or processing cylinder carrying the tools for the working or processing of the skins, characterized by a hydraulic servocontrol comprising hydraulic jacks controlled by a valve which in turn is actuated by an adjusting member for maintaining the distance between the axis of the supporting roller and the operating or processing cylinder at a predetermined value and to keep that value constant depending on the selected adjusted position of the adjusting member.

2. A device according to claim 1, characterized in that the assembly or unit comprising the operating or processing cylinder is mounted in supports adjustably movable toward and away from said supporting and transporting rollers, in the frame of the machine.

3. A device according to claim 2, characterized in that said device has a frame, said operating or processing cylinder has an adjustable support therefor, and said valve has a first member fixed to said adjustable support and a second member movable relatively to said first valve member and adjustably coupled to said frame.

4. A device according to claim 3, characterized in that the valve is a balancing valve constituted by a small cylinder within which is slidable a spring urged piston whose stem projects from the cylinder and is kept in contact with the adjusting member by said spring.

5. A device according to claim 4, characterized in that the member connected to the support of the operating or processing cylinder is mounted in displaceable manner on said support and in that the relative position of these two parts is determined by the degree of wear consumption of the tools.

6. A device according to claim 5, characterized in that the member mounted in a displaceable manner on the support of the operating or processing cylinder which follows the consumption of the tools, is kept in contact with a member mounted on the operating or processing cylinder at the working surfaces of the tools and which undergoes the same consumption as the tools.

References Cited in the file of this patent
UNITED STATES PATENTS 2,054,443     Pierson _____ Sept. 15, 1936
2,685,791     Hall _____ Aug. 10, 1954